(12) United States Patent
Flockhart et al.

(10) Patent No.: US 8,718,267 B2
(45) Date of Patent: May 6, 2014

(54) ANALYTICS FEEDBACK AND ROUTING

(75) Inventors: Andrew D. Flockhart, Thornton, CO (US); Joylee Kohler, Northglenn, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 139 days.

(21) Appl. No.: 13/250,718

(22) Filed: Sep. 30, 2011

(65) Prior Publication Data
US 2013/0083916 A1 Apr. 4, 2013

(51) Int. Cl.
*H04M 3/523* (2006.01)

(52) U.S. Cl.
USPC ............. 379/265.06; 379/265.08; 379/265.12

(58) Field of Classification Search
CPC ... H04M 3/5175; H04M 3/5233; H04M 3/51; H04M 3/523; H04M 3/5232; H04M 3/5238; H04M 2203/401; H04M 2203/402
USPC ........................................ 379/265.01–265.14
See application file for complete search history.

(56) References Cited

U.S. PATENT DOCUMENTS

| | | | |
|---|---|---|---|
| 7,792,773 B2 | 9/2010 | McCord et al. | |
| 8,078,486 B1 * | 12/2011 | McLean et al. | 705/7.14 |
| 8,209,218 B1 * | 6/2012 | Basu et al. | 705/7.39 |
| 2006/0147025 A1 * | 7/2006 | Dezonno et al. | 379/265.02 |
| 2007/0195945 A1 * | 8/2007 | Korenblit et al. | 379/265.06 |
| 2007/0198330 A1 * | 8/2007 | Korenblit et al. | 705/11 |
| 2007/0230682 A1 * | 10/2007 | Meghan et al. | 379/265.06 |
| 2010/0086120 A1 * | 4/2010 | Brussat et al. | 379/265.12 |
| 2010/0235218 A1 | 9/2010 | Erhart et al. | |
| 2010/0274637 A1 * | 10/2010 | Li et al. | 705/11 |
| 2010/0296417 A1 | 11/2010 | Steiner | |
| 2010/0318400 A1 * | 12/2010 | Geffen et al. | 705/9 |
| 2011/0007889 A1 * | 1/2011 | Geffen et al. | 379/265.06 |
| 2011/0125793 A1 | 5/2011 | Erhart et al. | |
| 2011/0125826 A1 | 5/2011 | Erhart et al. | |
| 2011/0255681 A1 | 10/2011 | Flockhart et al. | |
| 2011/0255682 A1 | 10/2011 | Flockhart et al. | |
| 2011/0255683 A1 | 10/2011 | Flockhart et al. | |
| 2011/0255684 A1 | 10/2011 | Flockhart et al. | |
| 2011/0255685 A1 | 10/2011 | Flockhart et al. | |
| 2012/0300920 A1 * | 11/2012 | Fagundes et al. | 379/265.05 |

OTHER PUBLICATIONS

Fagundes et al., U.S. Appl. No. 13/115,657, Entitled "Grouping of Contact Center Agents", filed May 25, 2011, 40 pages.

\* cited by examiner

*Primary Examiner* — Harry S Hong
(74) *Attorney, Agent, or Firm* — Sheridan Ross P.C.

(57) ABSTRACT

A contact center is described along with various methods and mechanisms for administering the same. The contact center proposed herein provides the ability to, among other things, dynamically and in real-time utilize contact center analytics feedback mechanisms to adjust parameters that are used in making work assignment decisions. The adjusted parameters may correspond to Key Performance Indicators (KPIs) for agents of the contact center rather than skill values for the agents.

20 Claims, 5 Drawing Sheets

ANALYTICS FEEDBACK AND ROUTING

FIELD OF THE DISCLOSURE

The present disclosure is generally directed toward communications and more specifically toward contact centers.

BACKGROUND

Contact routing (i.e., work assignment decision-making in a contact center environment) is currently performed based on a comparison of agent skill to contact skill requirements. The agent skill is a single value (usually a scalar value ranging from 1 to 16) that represents a number of different factors including agent proficiency (often referred to as Key Performance Indicator (KPI) metrics, which can include First Call Resolution (FCR), CSS, $/call, $/min, Profit/call, Profit/min, Average Handle Time (AHT), Abandon Rate, closure rate, quality score, commit to pay rate, revenue/target, etc.), agent preference, and other subjective criteria.

Unfortunately, an agent's skill level is a grossly simplified representation of the agent's ability to actually handle a contact having certain processing requirements. Another unfortunate reality is that agent skill level is often subject to the opinions of their supervisors (which may or may not accurately reflect the agent's true ability to handle contacts of a certain type). The reason, however, that agent skill is used as the basis for making work assignment decisions is that if more detailed metrics (e.g., the actual KPI metrics) were used for making such decisions, the processing overhead would be enormous and contact centers would either be more expensive to implement or more difficult to maintain. In particular, routing based on actual KPI metrics would not be feasible in contact centers that employ traditional skill-based routing paradigms (e.g., skill-based queues).

In particular, prior art contact centers typically make routing decisions based on agent skill level (an abstraction of true agent capabilities). There is no currently-available contact center solution that allows real-time KPI metrics to be used for making routing decisions.

In addition to the above, the expense of manually administering a contact center is already substantially high. Especially for larger contact centers having thousands of agents and many skill levels, it is practically infeasible to manually administer skill changes (because there have been minor changes in KPI metrics) on a regular basis. Specifically, if a large contact center having 10,000 agents with each agent having multiple skills (e.g., 16) were tasked with changing only 1% of skills on a weekly basis (due to KPIs changing), there would have to be approximately 1600 manual skill changes every week. This is a primary reason why many large contact centers do not update skill levels for agents every time the agent's KPI changes slightly.

SUMMARY

It is with respect to the above issues and other problems that the embodiments presented herein were contemplated. This disclosure proposes an analytics engine that works in conjunction with a work assignment engine. In some embodiments, the analytics engine monitors or receives, in real-time, agent performance information and determines real-time KPI metrics for all resources/agents in the contact center. The analytics engine then selects which of the real-time KPI metrics are to be selected (based on goals or business rules) as matching parameters to be used by the work assignment engine. As one example, if business rules or goals dictate that profit/call should be highly regarded (e.g., because it is the end of the fiscal year) then the KPI metrics which maximize profit/call can be selected by the analytics engine and then provided to the work assignment engine to route on. Conversely, if business goals change to focus on customer satisfaction or minimized wait time, then the analytics engine can select different KPI metrics to provide to the work assignment engine.

In some embodiments, the analytics engine may also be configured to normalize some or all KPI metrics based on how far the current KPI metric is from the goal for that metric (e.g., current KPI metric above or below target KPI metric and by how much). This normalized KPI metric may be the actual value provided to the work assignment engine as the matching parameters. The work assignment engine can then calculate a routing score for the KPI metrics based on a weighted average for the normalized KPI metrics, which can be used for making the work assignment decision.

In some embodiments, the technology which enables routing decisions based on a plurality of KPI metrics (real-time and/or non-real-time) rather than a single skill value is the concept of a next generation contact center that does not solely rely on skill-based routing or the notion of queues. Examples of such contact centers are described in further detail in U.S. patent application Ser. No. 12/882,950 to Flockhart et al., the entire contents of which are hereby incorporated herein by reference. Specifically, bitmaps and masks (calculated based on the KPI metrics received from the analytics engine) can be utilized for making the routing decision.

The system described herein can also include the capability to dynamically change what KPI metric(s) is/are used in real-time based on changing conditions of the contact center or a change in focus of the contact center administrator. These changes can be made easily without altering the core of the routing engine logic.

As used herein, KPIs may include, without limitation, any metric or combination of metrics that define performance of an entity within a contact center (e.g., a contact center agent, a group of contact center agents, etc.). Specifically, a KPI can be defined in terms of making progress toward strategic goals or simply the repeated achievement of some level of an operational goal.

In a contact center context, KPIs may vary depending upon whether work items correspond to outbound contacts (e.g., contacts originated by the contact center) or inbound contacts (e.g., contacts received at the contact center that have been originated outside the contact center). Non-limiting examples of outbound contact KPIs include: Contacts per hour—Average number of customers a call center agent was able to contact within an hour; Leads Conversion Rate—The percentage of leads that actually converted to sales; Hourly Sales—The average amount of sales the call center representative was able to close in an hour; Daily Sales—The average value of sales the agent was able to close in a day; and Accuracy—Extent to which a contact has been handled according to a predetermined script.

Non-limiting examples of inbound contact KPIs include: Real time Q—Metrics; Calls per hour—The average number of calls the agent is able to take per hour; Saves/One-Call Resolutions—The number of times our agents are able to resolve an issue immediately within the first phone call. Colloquially referred to as "one-and-done" calls; Average Handle Time—How long it takes for one call to be handled, which includes the call time itself, plus the work done after that call; Average Wait Time—How long a caller is put on hold before a call center agent becomes available to take the call; Accuracy; Abandonment Rate—This is the percentage of customers who disconnected before an agent was able to intercept the call; and Completion Rate—The ratio of successfully finished calls to the number of attempted calls by the customer.

Other types of KPIs that are not necessarily specific to inbound or outbound contacts include, without limitation, customer satisfaction level, customer service level, average speed of answer, contact forecast precision level, quality of services rendered, average handling cost of a contact, agent occupancy ratio, schedule adherence and conformity, and time distribution (in service, non-service detailed time or "shrinkage"). Other examples include number of times calls are put on hold, number of transfers, $/min, $/call, number of upsells, number of cross-sells, etc.

In accordance with at least some embodiments of the present disclosure, a method is provided which generally comprises:

receiving, at an analytics engine in the contact center, a plurality of performance indicator inputs that describe different aspects of resource performance in at least one of real-time and near-real-time;

receiving, at the analytics engine, one or more business rules that define a desired performance of the contact center;

based on the one or more business rules, selecting a subset of performance indicators from the plurality of performance indicator inputs;

utilizing the subset of performance indicators as matching parameters; and assigning at least one work item in the contact center to at least one resource in the contact center based on the matching parameters.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
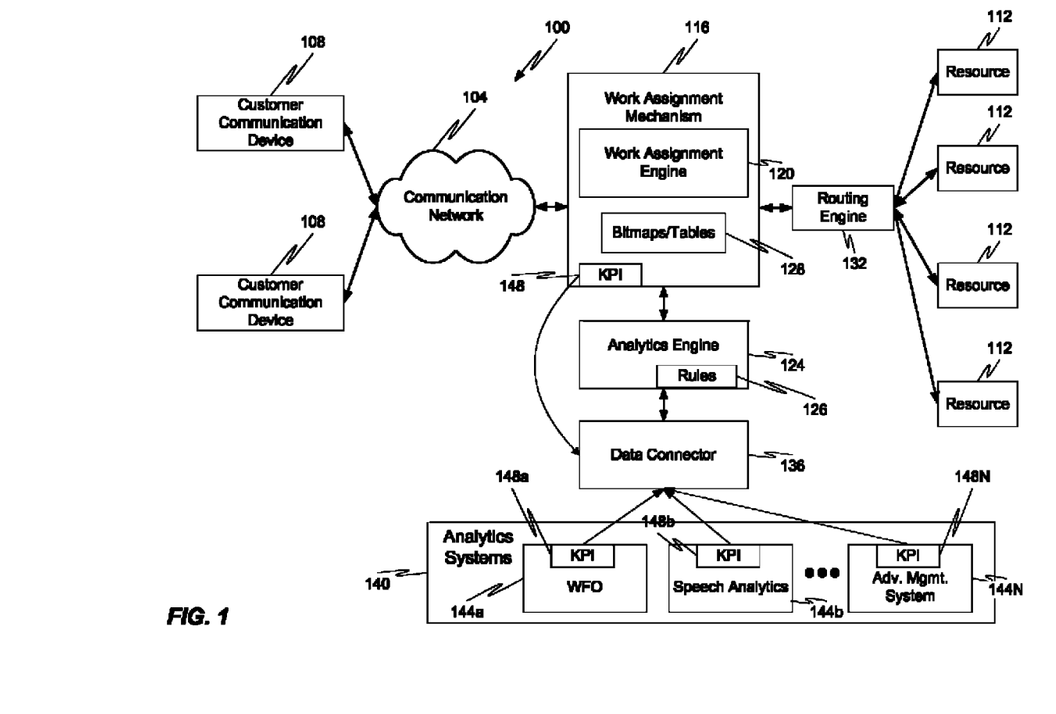
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can generated bitmaps/tables 128 and determine, based on an analysis of the bitmaps/tables 128, which of the plurality of processing resources 112 is eligible and/or qualified to receive the work item and further determine which of the plurality of processing resources 112 is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching by utilizing the bitmaps/tables 128 and any other similar type of data structure.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the system 100 may also comprise an analytics engine 124 and one or more bitmaps/tables 128. The analytics engine 124 and/or bitmaps/tables 128 may be internal to the work assignment mechanism 116 or they may be separate from the work assignment mechanism 116. In some embodiments, the analytics engine 124 may be configured to receive or collect a plurality of real-time data inputs from various analytics systems 140 that are internal to the contact center or external to the contact center. In some embodiments, there is a data connector 136 residing between the analytics engine 124 and analytics systems 140. The data connector 136 may be configured to retrieve, on a predetermined basis, KPIs 148a-N from the analytics systems 140. Specifically, the analytics systems 140 may comprise a number of specific analytic tools that analyze various different performance aspects of the resources 112 and generate KPIs 148a-N based on their analysis of the resource 112 performance.

Although three analytics tools are shown in the analytics systems 140, it should be appreciated that a greater or lesser number of analytics tools may be used to generate KPIs 144, 148 that are harvested by the data connector 136 and eventually sent to the analytics engine 124. Some non-limiting examples of analytics tools that may be included in the analytics systems 140 are a Work Force Optimizer (WFO), a speech analytics tool, a video analytics tool, a context analytics tool, advanced management information systems, or any other analytics tools known in the contact center arts.

The data connector 136 may also be adapted to collect KPIs 148 that are generated by the work assignment mechanism 116. Examples of KPIs 148 that are generated by the work assignment mechanism 116 (or specifically the work assignment engine 120) include, but are not limited to, occupancy, handle time, and idle time statistics for the resources 112. Of course, one or more of these KPIs 148 may be generated by an analytics tool in the analytics systems 140.

As discussed above, the data connector 136 may be configured to harvest or pull KPI data from the analytics systems 140 on a predetermined basis (e.g., every second, ten seconds, minute, half-hour, hour, day, week, month, etc.) and provide the collected KPI data to the analytics engine 124. The length of the predetermined basis can be altered by the work assignment engine 120 and/or analytics engine 124 or it may be manually administered.

In some embodiments, each analytics tool may be configured to generate its own set of KPIs. It may be possible that multiple instances of some KPIs are generated by different analytics tools. If this is the case, the data connector 136 may be configured to normalize the multiple instances of the KPIs from the different sources, aggregate the multiple instances of KPIs from the different sources, or otherwise combine the multiple instances of KPIs from the different sources before such information is provided to the analytics engine 124. It may also be possible that the data connector 136 simply aggregates the data from each of the analytics tools and forwards it on the analytics engine 124 which is configured to sort or manipulate the KPIs as needed.

In some embodiments, the KPIs that are retrieved at the data connector 136 and provided to the analytics engine 124 describe the current operating conditions of the contact center. The analytics engine 124 may utilize the inputs and one or more business rules 126 that define desired operating goals of the contact center to select one or more real-time KPIs. The selected one or more KPIs (e.g., a subset of the KPIs received from the data connector 136) may then be provided to the work assignment engine 120. The work assignment engine 120 can then utilize the KPIs received from the analytics engine 124 and the bitmaps/tables 128 to make a work item assignment decision. In particular, the work assignment engine 120 may use the KPIs received from the analytics engine 124 as routing parameters. The KPIs, as routing parameters, can be used to build one or more bitmaps/tables 128 that will eventually cause a work item to be assigned to a resource 112.

As noted above, the analytics engine 124, or portions thereof, may be implemented in the routing engine 132 or some other separate server or switch that is connected to the work assignment mechanism 116. It may also be possible to implement multiple analytics engines 124 at different locations in the contact center. Likewise, the data connector 136 or any other component not depicted as being incorporated into the work assignment mechanism 116 may be incorporated in the work assignment mechanism without departing from the scope of the present disclosure. Additionally, the functions performed by any of the components of the system 100 may be performed by other components without departing from the scope of the present disclosure. As a non-limiting example, the functions of the data connector 136 may be implemented by the analytics engine 124.

Figure 2:
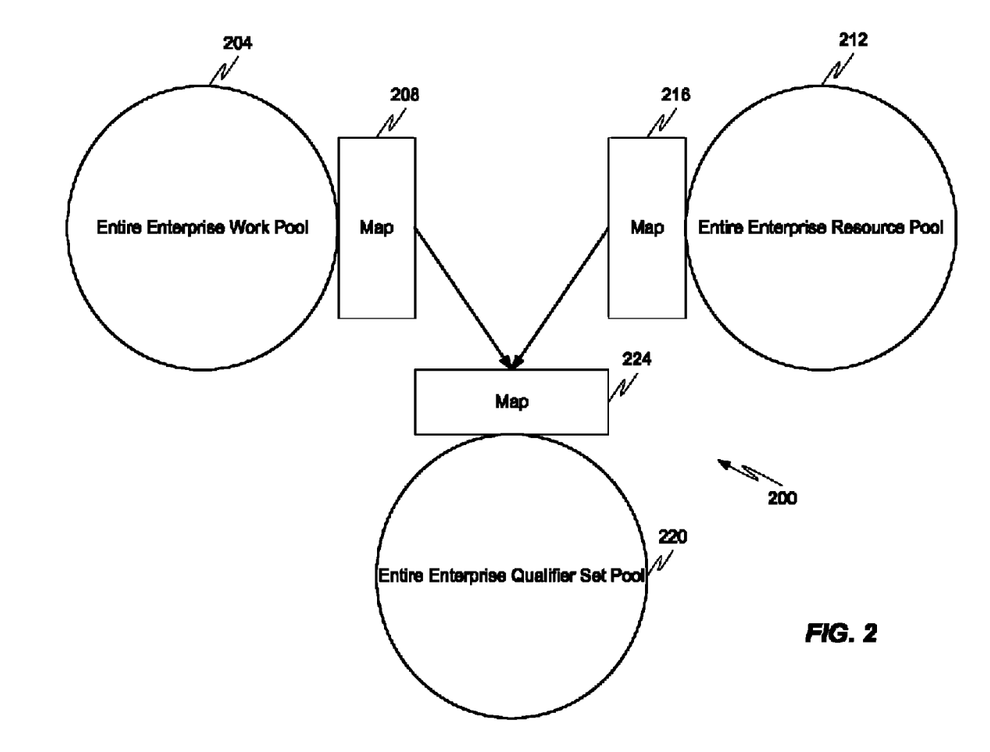
FIG. 2 is a block diagram depicting pools and bitmaps that are utilized in accordance with embodiments of the present disclosure.

FIG. 2 depicts exemplary data structures 200 which may be incorporated in or used to generate the bitmaps/tables 128 used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center.

In some embodiments, the population of the work pool 204 may be limited to work items waiting for service by a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Accordingly, the values in the bitmaps 208, 216, 224 may be recalculated each time the state of a pool changes (e.g., when a work item surplus is detected, when a resource surplus is detected, and/or when new KPIs are provided from the analytics engine 124 to the work assignment engine 120).

Furthermore, the values of the qualifier set bitmap 224 may be dynamically changed by the work assignment engine 120. In particular, the qualifier set bitmap 224 may be dynamically changed during contact center operations based on the different KPIs that are provided from the analytics engine 124 to the work assignment engine 120. As the qualifier set bitmap 224 is altered, the parameters that define how work items should be assigned to resources 112 will also vary.

Figure 3:
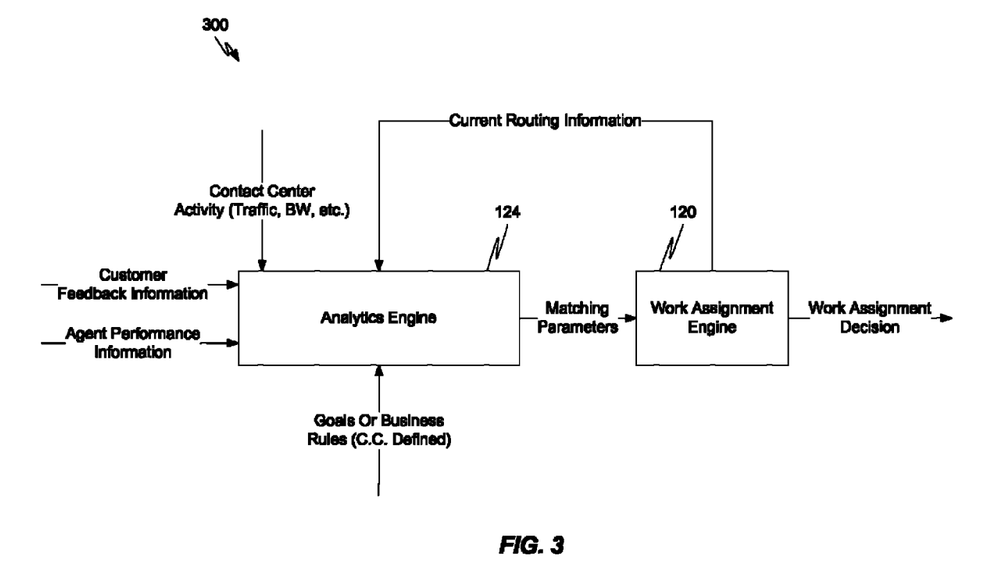
FIG. 3 is a block diagram information flows between contact center components in accordance with embodiments of the present disclosure.

With reference now to FIG. 3, data flows into and out of the analytics engine 124 and work assignment engine 120 will be described in accordance with at least some embodiments of the present disclosure. Specifically, the analytics engine 124 may be configured to receive a plurality of inputs from the data connector 136 or other sources that describe, in real-time or near-real-time, the operational conditions of the contact center. As one non-limiting example, the analytics engine 124 may receive real-time, historical, and/or predicted future information regarding the contact center activity in the form of traffic information (e.g., number of contacts/work items received within a predetermined amount of time, rate of incoming work items, rate of outbound work item generation, types of work items being received as a function of time, etc.), bandwidth information (e.g., number of resources 112 available at a given time, percentage of resources 112 available over a period of time, number of resources 112 predicted to be available at some time in the future, rate at which resources 112 are completing work items, etc.).

As another example, the analytics engine 124 may receive customer feedback information and/or agent performance information. This information may be obtained as KPIs 144, 148 from the data connector 136. The customer feedback information and/or agent performance information may correspond to real-time information or historical information. Specifically, with respect to agent performance information, if an agent is having a particularly good day, that agent's KPI metrics may be enhanced compared to their historical KPI metrics. The real-time KPI metrics for that agent may be provided to the analytics engine 124 via the data connector 136 to enable the analytics engine 124 to determine, in real-time, which agents are currently performing well and which agents are not. This information is much more useful than skill values which are either static or only configurable at the end of a work day (by a system administrator). The customer feedback information may also be used to determined historical or real-time KPI metrics for an agent. In particular, a customer's feedback regarding current or recent interactions with an agent can be used to determine how an agent is performing in real-time.

Goals or business rules may also be provided to the analytics engine 124 as an input. The analytics engine 124 may utilize the goals or business rules to select which KPIs should be provided to the work assignment engine 120 as matching parameters. The goals or business rules may be used alone or in combination with contact center activity. As an example, the goals or business rules may be variable based upon current contact center activity (e.g., if current work item traffic can be met based on current resource 112 bandwidth, then a first contact center goal (e.g., maximize profit/call) may be used to select KPIs whereas if current work item traffic is too large for the available resources 112 and delays are expected, then a second contact center goal (e.g., minimize wait time or minimize call handle time) may be used to select KPIs).

The customer feedback information and/or agent performance information may also be used to select business rules. Specifically, if certain performance metrics are not meeting their predefined goals, then a first contact center business rule may be used to select KPIs whereas if current performance is meeting performance goals, then a second contact center business rule may be used to select KPIs.

It should also be appreciated that the goals or business rules may be defined, in real-time (e.g., while the contact center is operational and received work items), by an administrator of the contact center. Specifically, the analytics engine 124 enables the contact center to change is goals or business rules at any point in time. Upon registering that a change in goals or business rules has been received, the analytics engine 124 may change, also in real-time, the KPIs that are provided to the work assignment engine 120 as matching parameters.

As noted above, the work assignment engine 120 may use the matching parameters received from the analytics engine 124 (in the form of real-time KPIs) to make work assignment decisions. Specifically, the work assignment engine 120 may utilize the matching parameters to generate one or more bitmaps/tables 128 that can be used for matching work items to available resources 112. Once a work assignment decision has been made, the work assignment engine 120 may provide the results of the work assignment decision to the routing engine 132. Furthermore, the work assignment engine 120 may provide the results of the work assignment decision to the analytics engine 124 as another input to the analytics engine 124 (e.g., as current routing information). The analytics engine 124 may utilize the current routing information to update KPIs for agents, update current contact center activity information, and update any other data that defines how the contact center is currently operating.

Figure 4:
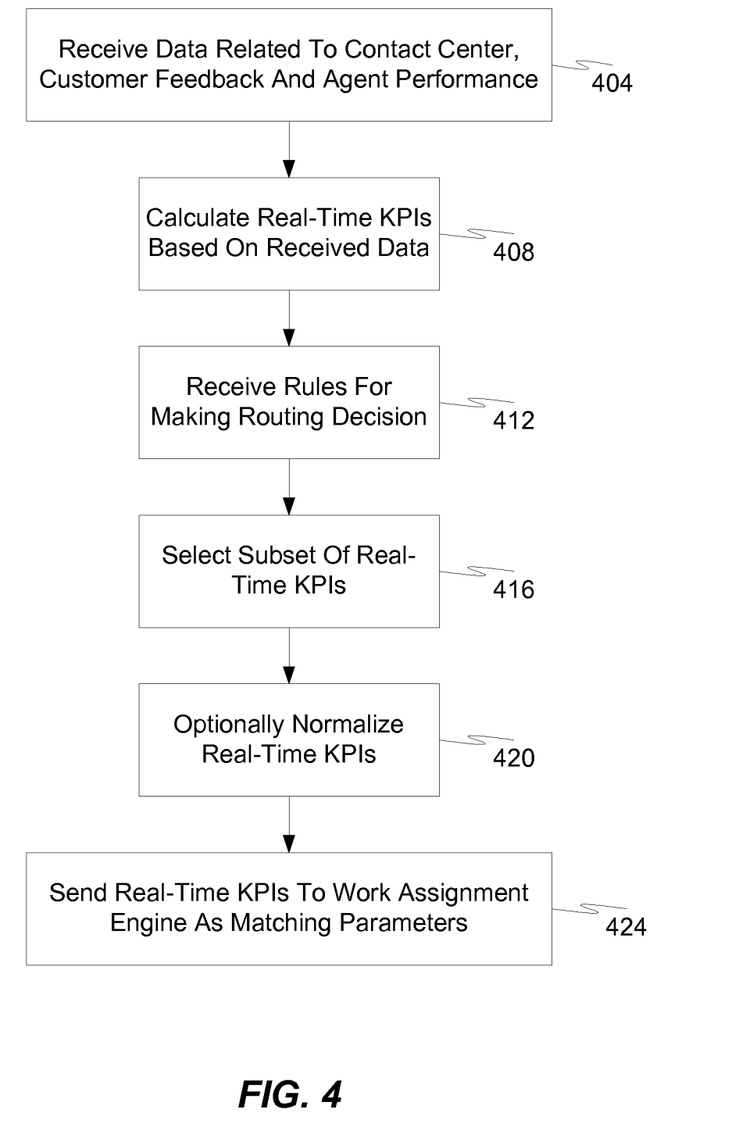
FIG. 4 is a flow diagram depicting a method of determining KPI metrics for use as routing parameters in accordance with embodiments of the present disclosure.

With reference now to FIG. 4, a method of determining KPI metrics for use as routing parameters will be described in accordance with embodiments of the present disclosure. The method begins when the analytics engine 124 receives one or more of the various inputs described in connection with FIG. 3 from the data connector 136 or from other data sources (step 404). Specifically, the analytics engine 124 may receive one or more of contact center activity, customer feedback information, and agent performance information.

The information received at the analytics engine 124 may be provided as KPIs or the analytics engine 124 may utilize the received inputs to calculate real-time KPIs for the various resources 112 (e.g., agents) that are in the contact center (step 408). In some embodiments, the various analytics tools in the analytics system 140 generate KPIs 144, 148 on a regular basis and the data connector 136 retrieves those KPIs and provides them to the analytics engine 124.

The analytics engine 124 may then receive rules for making routing decisions (step 412). The rules for making routing decisions may be received in the form of goals or business rules. Non-limiting examples of such rules include minimize a single KPI, maximize a single KPI, minimize a combination of KPIs, maximize a combination of KPIs, attempt to make one KPI as close as possible to a goal for that KPI, attempt to make a plurality of KPIs as close as possible to the goal for each KPI, do not allow a KPI to exceed or fall below a predetermined value, do not allow a plurality of KPIs to exceed or fall below a predetermined value, or a combination thereof.

The rules for making routing decisions may then dictate which KPI(s) the analytics engine 124 will include as the matching parameters that are to be provided to the work assignment engine 120 (step 416). In some embodiments, the analytics engine 124 only provides a subset of all possible KPIs for agents to the work assignment engine 120. This helps reduce the computations that will be required of the work assignment engine 120. However, because the analytics engine 124 is providing the work assignment engine 120 with actual KPI values (which may be real-time KPI values) as matching parameters, the work assignment engine 120 will be allowed to make work assignment decisions based on real-time and relevant data.

In some embodiments, the analytics engine 124 may optionally normalize the KPI(s) before providing the KPI(s) to the work assignment engine 120 (step 420). Specifically, the analytics engine 124 may be configured to determine how far away each selected KPI is from the goal for that KPI (e.g., as an absolute value or +/−a certain amount). The analytics engine 124 may calculate the normalized KPI in any number of ways. As one example, the analytics engine 124 may determine the difference between the current KPI value and the goal for that KPI value and then divide the difference by the goal for the KPI value. Normalization may be particularly useful in situations where the analytics engine 124 selects a plurality of KPIs, as the normalization may help reduce the importance of one KPI as compared to another KPI. However, it may also be possible to normalize KPIs so as to emphasize certain KPIs relative to other KPIs.

The selected KPI value(s), whether normalized or not, may then be provided from the analytics engine 124 to the work assignment engine 120 as matching parameters (step 424).

Figure 5:
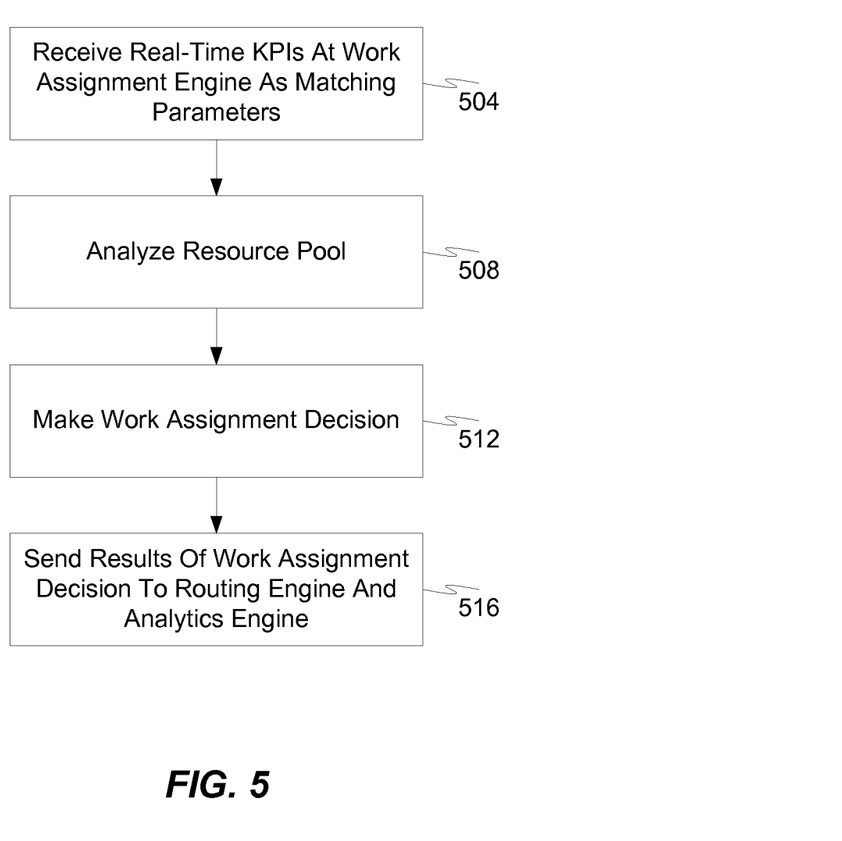
FIG. 5 is a flow diagram depicting a method of making a work assignment decision in accordance with embodiments of the present disclosure.

FIG. 5 depicts a work assignment decision-making method as executed by the work assignment engine 120 in accordance with embodiments of the present disclosure. The method begins where the method of FIG. 4 left off; specifically with the work assignment engine 120 receiving one or more real-time KPIs from the analytics engine 124 (step 504). The real-time KPIs received at the work assignment engine 120 may correspond to values that will be used as matching parameters (e.g., parameters to be used to match a work item to a resource 112). In particular, the work assignment engine 120 may utilize the matching parameters received from the analytics engine 124 to generate the bitmap 224 which defines the rules for matching a work item in the work item pool 204 to a resource 112 in the resource pool 212.

After the bitmap 224 has been prepared, the work assignment engine 120 analyzes the resource pool 212 to identify which resources 112, if any, are currently eligible (e.g., available) to process a work item (step 508). Another part of the analysis may involve the work assignment engine 120 determining which resource 112 is "best suited" for processing the work item. Because the work assignment engine 120 has prepared a bitmap 224 with real-time KPI information, the work assignment engine 120 is configured to make a work assignment decision based on real-time performance of the contact center and the resources 112 therein (step 512). This is significantly better than making work assignment decisions based on grossly oversimplified skill values or historical and possibly stale data.

The results of the work assignment decision (e.g., assign work item X to resource Y) is then provided from the work assignment engine 120 to the routing engine 132 so that the routing engine 132 can execute the work assignment decision (step 516). Specifically, the routing engine 132 can execute the work assignment decision by connecting a customer associated with the work item and the resource 112 (e.g., a contact center agent). As noted above, this execution may involve routing the customer directly to the resource 112 or establishing a conference call between the customer and one or more selected resources 112.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail.

In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of assisting routing behavior in a contact center, the method comprising:
   receiving, at an analytics engine in the contact center, a set of performance indicator inputs that describe different aspects of resource performance in at least one of real-time and near-real-time;
   receiving, at the analytics engine, one or more business rules that define a desired performance of the contact center;
   based on the one or more business rules, selecting a subset of performance indicators from the set of performance indicator inputs;
   utilizing the subset of performance indicators as matching parameters; and
   assigning at least one work item in the contact center to at least one resource in the contact center based on both the at least one work item in the contact center and at least one resource satisfying the matching parameters.

2. The method of claim 1, wherein at least one matching parameter corresponds to a normalized performance indicator in the subset of performance indicators.

3. The method of claim 1, wherein the subset of performance indicators are used to generate a bitmap that defines criteria for assigning work items from a work item pool to resources in a resource pool.

4. The method of claim 3, wherein the work item pool comprises a data instance for each work item in the contact center, wherein the resource pool comprises a data instance for each resource in the contact center, and wherein the assigning step comprises an analysis of every work item in the work item pool as well as an analysis of every resource in the resource pool.

5. The method of claim 1, wherein the set of performance indicators correspond to real-time performance indicators that describe at least one of an efficiency and effectiveness of a human agent in the contact center.

6. The method of claim 5, wherein the set of performance indicators comprise at least one of the following: First Call Resolution, $/contact, $/min, Profit/contact, Profit/min, Average Handle Time, Abandon Rate, agent preference, closure rate, quality score, commit to pay rate, revenue/target, and customer satisfaction.

7. The method of claim 1, wherein the one or more business rules comprise at least one of a maximization, minimization, and near-to function.

8. The method of claim 1, wherein a first subset of performance indicators is selected for a first business rule and wherein a second subset of performance indicators is selected for a second business rule.

9. The method of claim 1, wherein the set of performance indicator inputs comprise customer feedback information, real-time agent performance information, and routing information.

10. A non-transitory computer readable medium having stored thereon instructions that cause a computing system to execute a method, the instructions comprising:
   instructions configured to receive a set of performance indicator inputs that describe different aspects of contact center resource performance in at least one of real-time and near-real-time;
   instructions configured to receive one or more business rules that define a desired performance of the contact center;
   instructions configured to select, based on the one or more business rules, a subset of performance indicators from the set of performance indicator inputs;
   instructions configured to generate one or more bitmaps based on the subset of performance indicators; and
   instructions configured to assign at least one work item in the contact center to at least one resource in the contact center by referencing the one or more bitmaps.

11. The computer readable medium of claim 10, wherein the subset of performance indicators are normalized prior to generating the one or more bitmaps.

12. The computer readable medium of claim 10, wherein the one or more bitmaps define criteria for assigning work items from a work item pool to resources in a resource pool.

13. The computer readable medium of claim 12, wherein the work item pool comprises a data instance for each work item in the contact center, wherein the resource pool comprises a data instance for each resource in the contact center, and wherein the assigning step comprises an analysis of every work item in the work item pool as well as an analysis of every resource in the resource pool.

14. The computer readable medium of claim 10, wherein the set of performance indicators correspond to real-time performance indicators that describe at least one of an efficiency and effectiveness of a human agent in the contact center.

15. The computer readable medium of claim 13, wherein the set of performance indicators comprise at least one of the following: First Call Resolution, $/contact, $/min, Profit/contact, Profit/min, Average Handle Time, Abandon Rate, agent preference, and customer satisfaction.

16. The computer readable medium of claim 10, wherein the one or more business rules comprise at least one of a maximization, minimization, and near-to function.

17. A contact center, comprising:
an analytics engine configured to receive a set of performance indicator inputs that describe different aspects of contact center resource performance in at least one of real-time and near-real-time, receive one or more business rules that define a desired performance of the contact center, and select, based on the one or more business rules, a subset of performance indicators from the set of performance indicator inputs; and
a work assignment engine configured to receive the subset of performance indicators and then assign work items received at the contact center to resources of the contact center by generating one or more bitmaps based on the matching parameters the subset of performance indicators.

18. The contact center of claim 17, wherein the subset of performance indicators are normalized prior to being provided to the work assignment engine.

19. The contact center of claim 17, wherein the one or more bitmaps define criteria for assigning work items from a work item pool to resources in a resource pool, wherein the work item pool comprises a data instance for each work item in the contact center, wherein the resource pool comprises a data instance for each resource in the contact center, and wherein the assigning step comprises an analysis of every work item in the work item pool as well as an analysis of every resource in the resource pool.

20. The contact center of claim 17, wherein the set of performance indicators comprise at least one of the following: First Call Resolution, $/contact, $/min, Profit/contact, Profit/min, Average Handle Time, Abandon Rate, closure rate, quality score, commit to pay rate, revenue/target, agent preference, and customer satisfaction, wherein the one or more business rules comprise at least one of a maximization, minimization, and near-to function, and wherein different subsets of performance indicators are selected for the subset of performance indicators depending upon whether the one or more business rules comprises a maximization, minimization, or near-to function.

* * * * *